United States Patent Office 2,935,430
Patented May 3, 1960

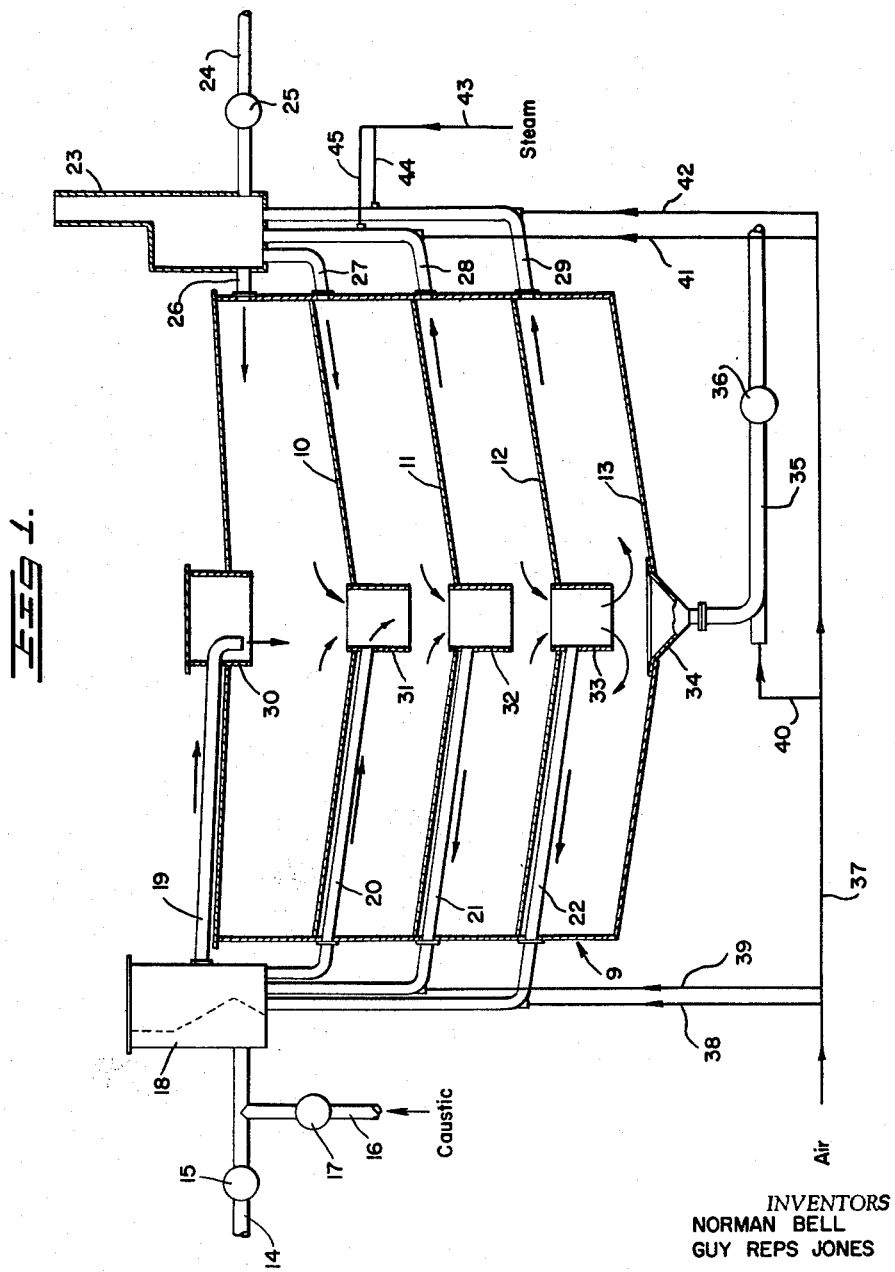

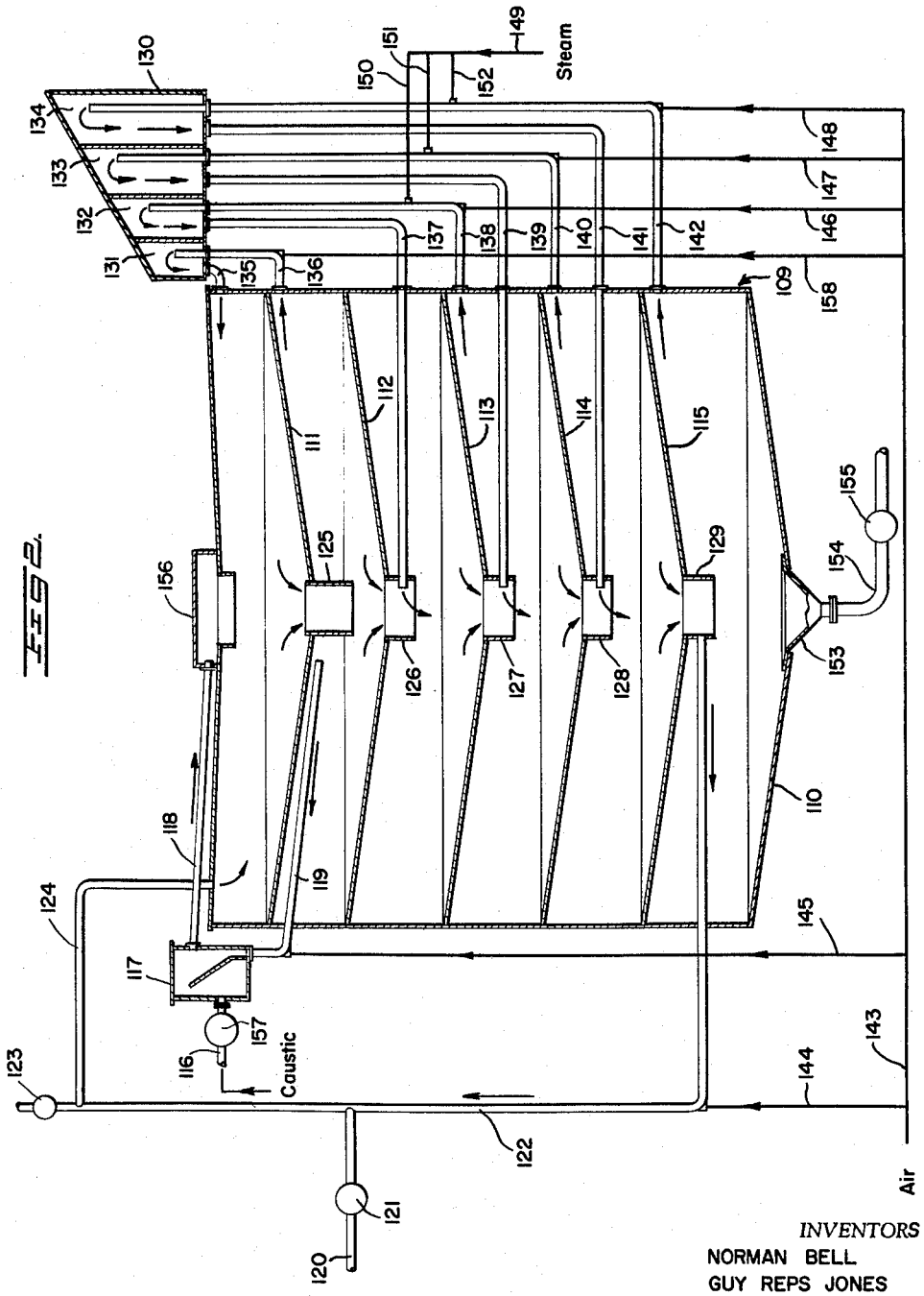

2,935,430

METHOD OF REMOVING SCALE

Norman Bell and Guy R. Jones, Baton Rouge, La., assignors to Kaiser Aluminum & Chemical Corporation, Oakland, Calif., a corporation of Delaware Application December 27, 1956, Serial No. 630,789

8 Claims. (Cl. 134—22)

This invention relates to a method of removing adherent scale formations from apparatus employed in the Bayer process for producing alumina from aluminous ores. More particularly the invention relates to a method of removing scale from the conduits, walls, and decks of mud settlers and mud washers employed in the Bayer process of recovering alumina from aluminous ores.

The particular scale referred to herein is a type of scale which is primarily a complex of alumina trihydrate ($Al_2O_3 \cdot 3H_2O$) combined with insoluble mud material primarily iron oxide ($Fe_2O_3$) which deposits upon the conduits, walls, and decks of the mud settlers and mud washers used in the Bayer process. The scale comprises about 46% $Al_2O_3$ by weight.

In the extraction of alumina from aluminous ores such as bauxite, by the Bayer process the aluminous ore is digested in a hot caustic liquor of predetermined concentrations. The temperature of the resultant supersaturated liquor containing dissolved alumina and also caustic insoluble materials is then reduced. At the reduced temperature the liquor is clarified of the caustic insoluble materials referred to as red mud. The red mud is settled from the liquor in a multicompartment Dorr-type tray thickener. The thickened mud solution which is removed from the alumina containing caustic liquor is then further processed in what is called a mud washing operation in a Dorr-type washing-tray thickener to recover caustic values and alumina. This type of apparatus used for settling and washing operations is conventional in the art and is described in Perry's "Chemical Engineers Handbook," Third Edition, 1950, pp. 942 and 953. The passage of the liquor through the mud settlers and the mud washers causes a layer of tenacious scale as described above to be formed on the inside surfaces of these process vessels. As the scale builds up on the inside surfaces of the mud washers and settlers, it interferes with proper rake operation and plugs the attendant piping. In order to maintain efficient settling and washing operations, this scale has to be removed periodically. It has been the practice to employ laborers to manually knock this scale off the metal surfaces of the walls with hammers. The attendant piping had to be dismantled for this means of scale removal.

With the method described by this invention, it is now possible to remove the scale without the difficulties of manually hammering it from the walls and the dismantling of attendant piping. By our novel method, a greater portion or all of this scale is dissolved and removed from the settlers and the washers in a hot caustic solution combined with proper circulation of the caustic through the vessels. The caustic dissolves the alumina in the scale and particles of insoluble mud fall to the decks of the settlers and washers. The treatment with caustic substantially reduces the amount of labor expended for descaling operations and lengthens the useful life of the vessels.

Therefore, it is an object of this invention to provide a method for removing scale from mud settlers and mud washers employed in alkaline alumina recovery processes. It is a further object to provide a wet process for removing scale formations from the mud settlers and washers employed in the Bayer type processes which is simple and effective for practical descaling purposes. Other and further objects will be apparent from the following description and disclosure, set forth herein.

According to our novel method for removing the scale formation from the surfaces of the mud washers and mud settlers, a caustic soda solution is used which contains little or no alumina dissolved therein. Solutions containing as little as 150 grams per liter of sodium hydroxide (expressed as sodium carbonate) and as much as 50% sodium hydroxide by weight (10–10.4 grams per liter) can be used in the descaling operation. Preferably solutions containing at least 220 grams of caustic per liter are used. Solutions already used in cleaning other settlers and washers containing as much as 50 grams per liter of alumina and a weight ratio of alumina-to-caustic soda (A/C) of as high as 0.20–.25 can be successfully utilized. The alumina-to-caustic soda ratio (A/C) is the weight ratio of $Al_2O_3/NaOH$ wherein the NaOH is expressed as equivalent $Na_2CO_3$. Thus, caustic used in cleaning one vessel may be used in cleaning another vessel. It is contemplated and within the scope of the present invention to use a caustic solution for descaling which is scheduled to be added to the Bayer plant liquor stream to replenish normal caustic losses. The caustic used in the cleaning operations of this invention is added to the process liquor stream used for alumina extraction after the cleaning operation. Before the caustic is removed from a settler or washer after the descaling operation, it is allowed to remain therein for a sufficient period of time to allow the insoluble mud particles introduced from the scale, to settle out of the caustic.

According to our novel method of descaling, it is necessary to first fill the vessel to be cleaned and descaled with a caustic solution of concentrations described above. The caustic is then heated and the temperature is maintained between 175 and 225° F. while the caustic is in the particular vessel being descaled. It is another important aspect of the present invention that the caustic be circulated throughout the various conduits, decks and compartments of the apparatus. It is also contemplated that the caustic while it is being circulated be agitated with air during the descaling operation. In practice the caustic is held in the settlers for about 5 days and in the washers for about 7 days. This period of time may vary according to the amount of scale present. The circulation of the caustic is accomplished by introducing compressed air at various points throughout the vessel. This application of the air pumping principal to caustic descaling of multicompartment vessels allows a caustic solution to be circulated with minimum cost and effort. The piping already present on the vessels serves as the lifting tubes and the return conduits, the overflow and feed boxes serve to separate the air from the liquid. Any other suitable pumping method known can be used, but it would appear to be more expensive on the basis of capital costs and operating costs.

A complete understanding of the method of this invention will be manifest from a reading of the following specification taken in conjunction with the following drawings, which latter are not intended to limit the invention, but to provide detailed description of complete specific embodiments thereof.

Referring to the drawings,

Figure 1 shows a side sectional view of a conventional multicompartment Dorr-type tray thickener used for the mud settling operation in alumina production. The rakes and drive mechanism have been omitted for purposes of clarity.

Figure 2 shows a side sectional view of a multicompartment Dorr-type washing-tray thickener used for mud washing operations. Again the rakes and drive mechanism have been omitted.

Referring to Figure 1, the mud settler 9, is composed of a circular vessel containing multicompartments with decks 10, 11, 12 and 13. Each deck is connected to a center feedwell 31, 32, 33 and cone 34 respectively. Cone 34 is a passage through which the underflow from the vessel in mud settling operations passes out through conduit 35 which contains valve 36. The feed box 18 is located near the upper periphery of the vessel and has attendant conduits 19, 20, 21 and 22 which pass into the vessel near each deck and are connected to the feedwells. Conduit 14 containing valve 15 is used in the mud settling operations for the introduction of the red mud laden solution. Conduit 16 contains valve 17 and is used for the introduction of caustic into the vessel for the descaling operations. In close proximity to the vessel 9 are three overflow boxes 23 in spaced relationship around the top periphery of the vessel, one of which is shown in Figure 1. The overflow box 23 contains attendant conduits 26, 27, 28 and 29 for the circulation of the caustic cleaning liquor throughout the various compartments of the vessel. Outlet conduit 24, containing valve 25, is connected to the overflow box 23. Shown also in the drawing are air header line 37 and steam header line 43.

In the operation of the process for the descaling operation, the settling operations of the vessel are discontinued, the vessel is drained of all mud containing solutions, and valves 15, 25, and 36 are closed. Valve 17 is opened and caustic solution in concentrations as described above is introduced through conduit 16, passes through feed box 18, and into conduits 19, 20, 21 and 22. When the vessel is completely filled with caustic solution, valve 17 is closed and the descaling operations are begun. As stated, the caustic solution must be heated and maintained at a particular temperature, and air is used for the circulation of the caustic. These are conditions necessary for the successful descaling operation. Compressed air is introduced through header line 37 and passes through inlet lines 38 and 39 into conduits 22 and 21 respectively. Air also passes through inlet lines 41 and 42 into conduits 28 and 29 respectively. This air introduction creates circulation of the caustic solution from decks 12 and 13 up through conduits 21 and 22, through the feed box 18 and back into the vessel through conduits 19 and 20 and feedwells 30 and 31. From the decks 12 and 13 through conduits 28 and 29, the caustic solution circulates through the overflow box 23 and into the top decks 10 and 11 of the vessel through conduits 26 and 27. Steam is introduced through header line 43 and passes through lines 44 and 45 into conduits 29 and 28 respectively for heating purposes. Steam is continually introduced until the desired temperature of the caustic is reached and intermittently thereafter to maintain the temperature at the proper degree.

Thus, a circulation of the caustic is continually maintained in the settler vessel. Agitation of the caustic is also accomplished by air introduction through line 40 which passes into conduit 35 and up through cone 34. The air rises through feedwells 33, 32, 31 and bubbles out from the surface of the liquid in feedwell 30. Some of the air disperses from the upward flow and enters the areas of decks 13, 12 and 11 and passes out through vent pipes (not shown) from each deck. This creates a turbulence of the caustic passing through the several feedwells and decks of the vessel. The lifting of the caustic from the bottom decks 12 and 13 causes a downward flow through the top decks 10 and 11 and feedwells 31, 32, and 33, such that continual circulation and agitation of the caustic in the vessel is accomplished. The circulation pattern is further denoted by the arrows in the drawing.

Referring now to Figure 2 which shows a multicompartment Dorr-type washing-tray thickener used for the mud washing operation in the Bayer process for alumina production, 109 generally refers to the circular mud washing vessel which contains a plurality of decks 111, 112, 113, 114 and 115. These decks are connected to feedwells 125, 126, 127, 128 and 129, respectively. The bottom deck 110 is connected to cone 153 which is connected to underflow conduit 154 containing valve 155. In close proximity to the mud washer vessel 110 is also a stand pipe composed of conduit 122 and 124. Attached to the standpipe is a feed line 120 containing a valve 121, which is used in the mud washing operation for the introduction of water. Valve 123 is connected to the vent part of the stand pipe. A feed box 117 containing inlet conduit 116 with valve 157 is used in the mud washing operation for the introduction of the thickened solution of red mud to be washed. The feed box has feed conduits 118 and 119 connected thereto, which pass into the upper decks 111 and 112 of the vessel. The overflow box 130 contains compartments 131–134 each of which have conduits leading to and from the vessel at the various decks as shown. Two of these overflow boxes are usually situated in spaced relationship at the outer periphery of the vessel. Only one is shown in the drawing. There are also two small boxes (not shown) at the outer periphery of the vessel that contain only overflow lines from the top two decks. The small boxes are the same as compartment 131 of overflow box 130. Two or more stand pipes may also be connected to the vessel whereas only one is shown in the drawing. Air header line 143 and steam header line 149 are also shown.

In the operation of this invention for the method of descaling the mud washer, the mud washing operations of the vessel are discontinued, and the vessel is drained of mud containing solution. Valves 121, 123 and 155 are closed. Caustic is introduced through line 116 until the vessel is completely filled. When the vessel is filled, valve 157 is closed and the caustic solution is then heated and circulated throughout the vessel. Thus, as in the mud settler the circulation of the caustic throughout the vessel is accomplished by the introduction of compressed air and heated by the introduction of steam. Air is introduced through air header line 143 which passes air into lines 144, 145, 146, 147 and 148 and 158. Air passes into standpipe conduit 122 lifting caustic from the feedwell 129 through conduit 122 and into the top deck 111 of the washer through conduit 124. Air introduced through line 145 passes into conduit 119 such that caustic is lifted out of the second deck 112 up through conduit 119, through the feed box 117 into conduit 118 and back through the center of the vessel through feedwell 156. Air introduced through air line 148 lifts caustic out of deck 110 through conduit line 142 up into compartment 134 of overflow box 130 wherefrom caustic flows back into the feedwell 128 through conduit 141. The same circulatory operation occurs when air is introduced through lines 146 and 147 whereby caustic is lifted from each respective deck through to the respective compartments of the overflow box and back into the respective feedwells. Air passing from line 158 into conduit 136 lifts caustic from deck 112 into compartment 131, wherefrom it passes through conduit 135 into the upper portion of deck 111. Thus, continuous circulation of the caustic solution is accomplished which passes caustic throughout the various compartments, conduits, and decks of the mud washer. The caustic is heated to the proper temperature and maintained there by the introduction of steam through steam header line 149 which passes into conduits 138, 140 and 142 through steam lines 150, 151 and 152, respectively.

Agitation and circulation are necessary in order to prevent a stagnant layer of caustic saturated with alumina, which has been dissolved from the scale, from collecting at the surface of the scale and retarding the dissolution of the scale by the caustic. Furthermore, circulation of the caustic maintains a more homogeneous solution. Elevated temperatures are desirable because the solubility of alumina in caustic increases with higher temperatures. The proper combination of temperature and circulation as heretofore described produces an efficient descaling operation for the mud washers and settlers.

Operation of the rakes (not shown in the drawings) provides additional mixing, if desired, and probably aids in dissolving the scale from the rakes.

As specific examples of the method of descaling according to the process of our invention, the following examples are given as specific embodiments:

Example 1

The number 5 settler used in mud settling operations for alumina production was disconnected from the main process liquor stream and was drained of the mud and liquor contained in the vessel. On inspection it was noted that a hard scale had formed on the inner surfaces of the settler. The scale varied from about one quarter to two inches in thickness. A 50% sodium hydroxide solution was pumped into the settler and diluted with well water to a concentration of 315.3 grams sodium hydroxide per liter (expressed as sodium carbonate). The settler was filled to nearly the top. Compressed air was introduced at the various points indicated in the description of the descaling operation of the mud settler above. Air introduction was continued for 5 days. Steam was also introduced at several points as described above until the temperature of the caustic liquor was approximately 220° F. Throughout the washing operation which was continued for 5 days, this temperature was maintained by intermittent introduction of steam. After this period of time, steam and air introduction were discontinued and the settler was drained and hosed down to remove adherent mud. Inspection of the settler disclosed that a substantial amount of the scale which had been on the surfaces and decks of the settler had been removed. The settler was then put back into mud settling operations.

Example 2

No. 3 washer was disconnected from the main process liquor stream and was drained of mud and liquor contained in the vessel. The inlet and outlets were closed. On inspection of the washer it was observed that a thick scale had formed on the inner surfaces. The washer was then filled with a caustic solution which was of a concentration of 222.0 grams per liter sodium hydroxide (expressed as sodium carbonate). Compressed air was then introduced at various points described above in the operation of the mud washer. Steam was also injected at the various points described above. This was continued for about 7 days. Temperature was maintained between 190 and 200° F. by intermittent introduction of steam. After 7 days, the air and steam introduction was discontinued and the washer was drained and hosed down to remove the adherent mud. On inspection, it was found that a substantial portion of the scale was removed. Upon analysis of the liquor removed, the A/C (alumina to caustic soda ratio) was approximately .053 indicating the alumina in the scale had dissolved in the caustic.

The successful and efficient descaling operation described, as applied to mud washers and settlers is accomplished mainly through the combination of continual circulation of the caustic and proper caustic temperatures. It is apparent that the process of this invention has a decided advantage over previously used manual descaling operations using hammers. The useful life of the vessels is thus lengthened and labor costs are materially reduced.

The scope of this invention is not intended to be limited by the particular described means of circulation and heating of the caustic solution. Thus, other types of circulatory means may be used for circulating the caustic. It is possible that the circulation of the liquor may be accomplished from the top of the vessel with steam circulation pumps. Furthermore, air lifts for the purpose of circulation may be replaced with other types of conventional pumping equipment for circulating the caustic throughout the vessel. Steam introduction for heating may be replaced by other types of heat exchange apparatus such as indirect heat exchange systems.

What we claim is:

1. A method of removing alumina-containing scale which has deposited on the inside surfaces of vessels used in mud washing and mud settling operations in the production of alumina, which comprises filling the vessel to be descaled with an aqueous solution comprising caustic soda having a concentration of between 150 and about 1000 grams NaOH (expressed as sodium carbonate) per liter, heating and maintaining said solution at a temperature of between about 175° F. and 225° F., continually circulating said solution throughout said vessel for a period of time sufficient to dissolve the scale from the surfaces of said vessel.

2. A method of removing alumina-containing scale which has deposited on the inside surfaces of vessels used in mud washing and mud settling operations in the production of alumina, which comprises filling the vessel to be descaled with an aqueous solution comprising caustic soda having a concentration of between 150 and about 1000 grams NaOH (expressed as sodium carbonate) per liter, heating and maintaining said solution at a temperature of between about 175° F., and 225° F., continually circulating said heated solution in said vessel by removing the solution from lower zones of said vessel and reintroducing said solution into upper zones of said vessel, for a period of time sufficient to dissolve the scale from the surfaces of said vessel.

3. The method of claim 2 wherein the solution is circulated from said lower zones to said upper zones of said vessel through an exteriorly disposed circulatory system, by the introduction of compressed air into said circulatory system.

4. The method of removing alumina-containing scale which has deposited on the inside surfaces of a multicompartment mud settling vessel used in the production of alumina, which comprises filling said vessel with an aqueous solution comprising caustic soda having a concentration of between 150 and about 1000 grams NaOH (expressed as sodium carbonate) per liter, heating and maintaining said solution at a temperature of between about 175° F., and 225° F., continually circulating said heated solution from lower compartments into upper compartments of said vessel through an exteriorly disposed circulatory system comprising an overflow chamber, said circulation being effected by introducing compressed air into said circulatory system, and continuing said circulation for a period of time sufficient to dissolve the scale from the surfaces of said vessel.

5. The method of claim 4 wherein the solution is heated by the introduction of steam into said exteriorly disposed circulatory system.

6. The method of claim 4 wherein agitation of the solution being circulated in said vessel is accomplished by the introduction of compressed air into the lower zone of said vessel.

7. The method of removing alumina-containing scale which has deposited on the inside surfaces of a multicompartment mud washing vessel used in the production of alumina, which comprises filling said vessel with an aqueous solution comprising caustic soda having a concentration of between 150 and about 1000 grams NaOH (expressed as sodium carbonate) per liter, heating and maintaining said solution at a temperature of between about 175° F. and 225° F., continually circulating said heated solution from a lower compartment into an adjacent upper compartment of said vessel through an exteriorly disposed circulatory system comprising an overflow chamber; said circulation being effected by introducing compressed air into said circulatory system, and continuing said circulation for a period of time sufficient to dissolve the scale from the surfaces of said vessel.

8. The method of claim 7 wherein the solution is heated by the introduction of steam into said exteriorly disposed circulatory system.

References Cited in the file of this patent

UNITED STATES PATENTS

| | | |
|---|---|---|
| 2,255,493 | Pfalzgraff | Sept. 9, 1941 |
| 2,259,260 | Matteson et al. | Oct. 14, 1941 |
| 2,598,963 | Armstrong et al. | June 3, 1952 |
| 2,662,041 | Dougherty et al. | Dec. 8, 1953 |
| 2,717,845 | Carter | Sept. 13, 1955 |

UNITED STATES PATENT OFFICE

CERTIFICATE OF CORRECTION

Patent No. 2,935,430                           May 3, 1960

Norman Bell et al.

It is hereby certified that error appears in the printed specification of the above numbered patent requiring correction and that the said Letters Patent should read as corrected below.

Column 1, line 56, for "be", first occurrence, read -- to --; column 2, line 14, for "10-10.4" read -- 1010.4 --.

Signed and sealed this 4th day of April 1961.

(SEAL)
Attest:     ERNEST W. SWIDER

Attesting Officer                                                                 ARTHUR W. CROCKER
                                                                              Acting Commissioner of Patents